G. W. BEADLE.
MACHINE FOR COATING CARTONS.
APPLICATION FILED OCT. 24, 1911.

1,030,636.

Patented June 25, 1912.

7 SHEETS—SHEET 1.

G. W. BEADLE.
MACHINE FOR COATING CARTONS.
APPLICATION FILED OCT. 24, 1911.

1,030,636.

Patented June 25, 1912.
7 SHEETS—SHEET 2.

G. W. BEADLE.
MACHINE FOR COATING CARTONS.
APPLICATION FILED OCT. 24, 1911.

1,030,636.

Patented June 25, 1912.

7 SHEETS—SHEET 3.

WITNESSES:

INVENTOR
Geo. W. Beadle,
ATTORNEYS

G. W. BEADLE.
MACHINE FOR COATING CARTONS.
APPLICATION FILED OCT. 24, 1911.

1,030,636.

Patented June 25, 1912.

7 SHEETS—SHEET 4.

WITNESSES:

INVENTOR
Geo. W. Beadle

ATTORNEYS

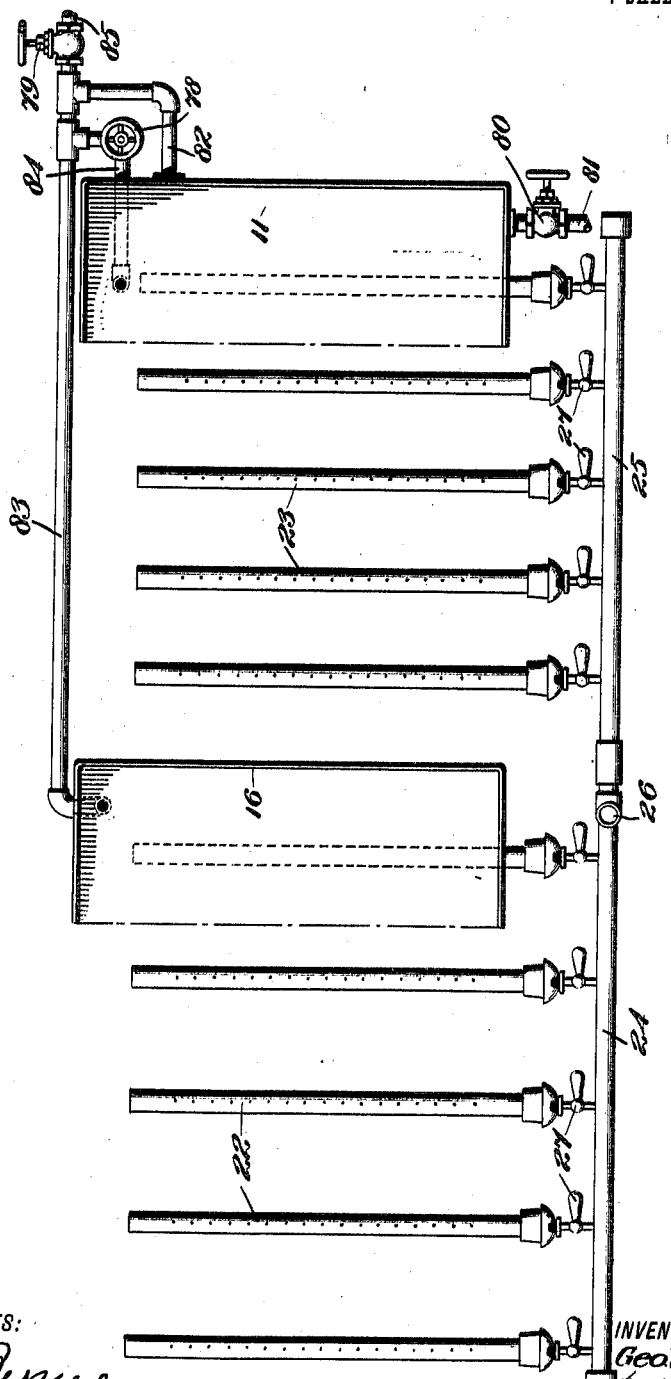

UNITED STATES PATENT OFFICE.

GEORGE W. BEADLE, OF BAYONNE, NEW JERSEY, ASSIGNOR TO SINGLE SERVICE PACKAGE CORPORATION OF AMERICA, OF NEW YORK, N. Y., A CORPORATION OF NEW JERSEY.

MACHINE FOR COATING CARTONS.

1,030,636.  Specification of Letters Patent.  Patented June 25, 1912.

Application filed October 24, 1911. Serial No. 656,438.

*To all whom it may concern:*

Be it known that I, GEORGE W. BEADLE, a citizen of the United States, residing at Bayonne, in the county of Hudson and State of New Jersey, have invented certain new and useful Improvements in Machines for Coating Cartons; and I do hereby declare the following to be a full, clear, and exact description of the invention, such as will enable others skilled in the art to which it appertains to make and use the same.

This invention relates to improvements in paraffining machines adapted to coat paper cartons or the like, and has for its object to provide a simple mechanism for this purpose that will melt and keep the paraffin at a proper temperature, and will automatically coat the carton with certainty and celerity.

A further object is to provide a simple and efficient means for receiving the cartons and conveying them away from the machine after they have been coated.

With these and other objects in view the invention consists in the novel details of construction and combinations of parts more fully hereinafter described and particularly pointed out in the claims.

Referring to the accompanying drawings forming a part of this specification in which like numerals designate like parts in all the views:—

Figure 1:
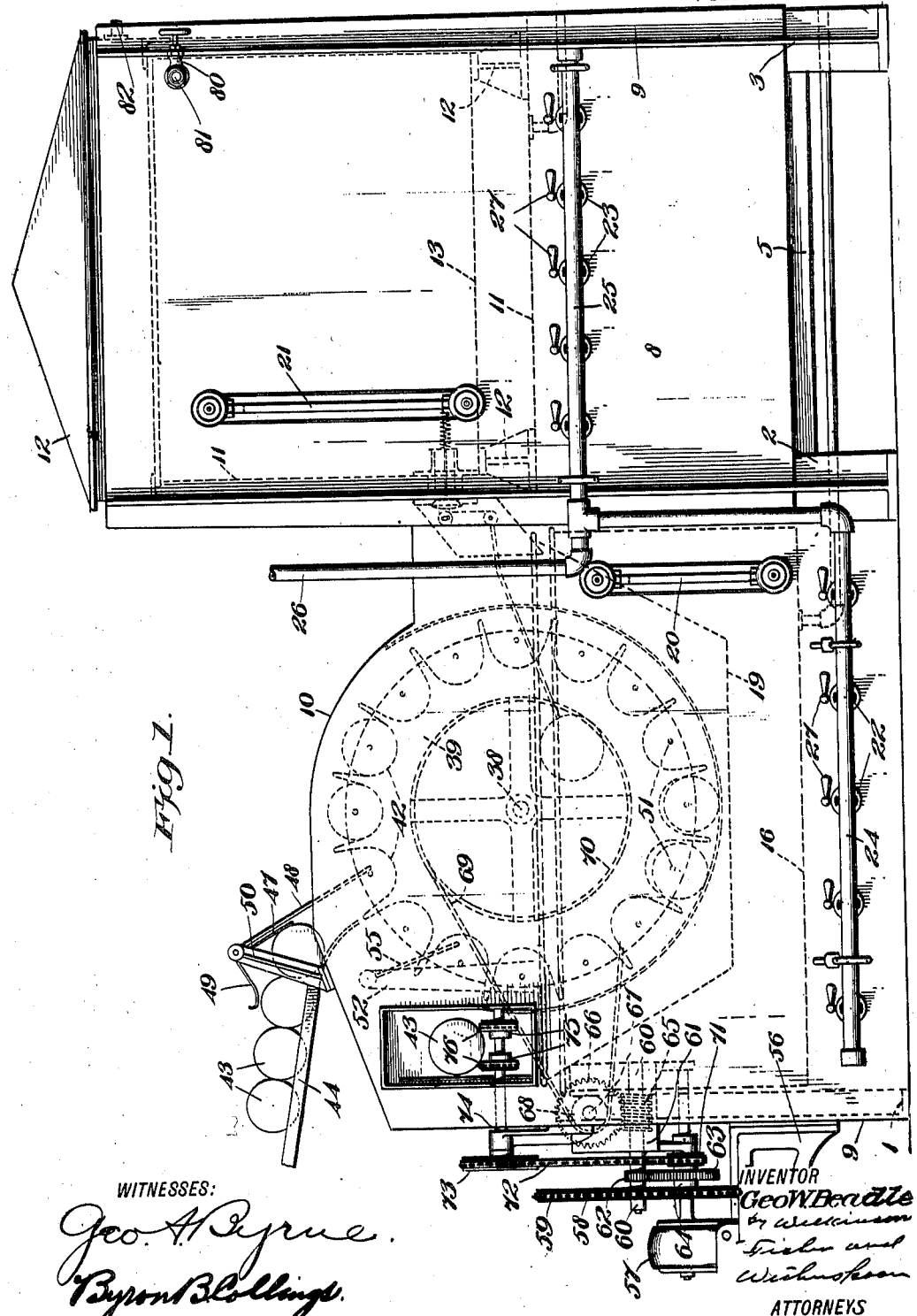
Figure 2:
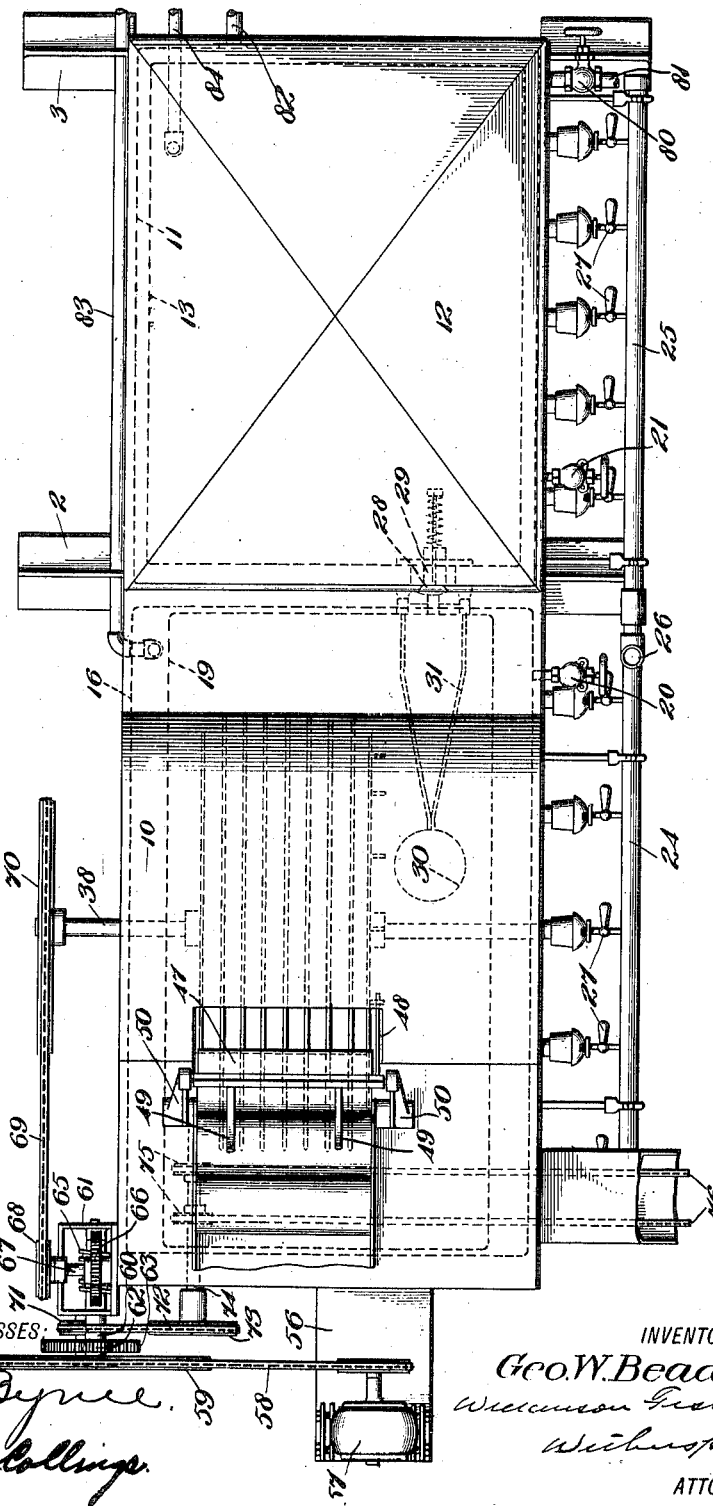
Figure 3:
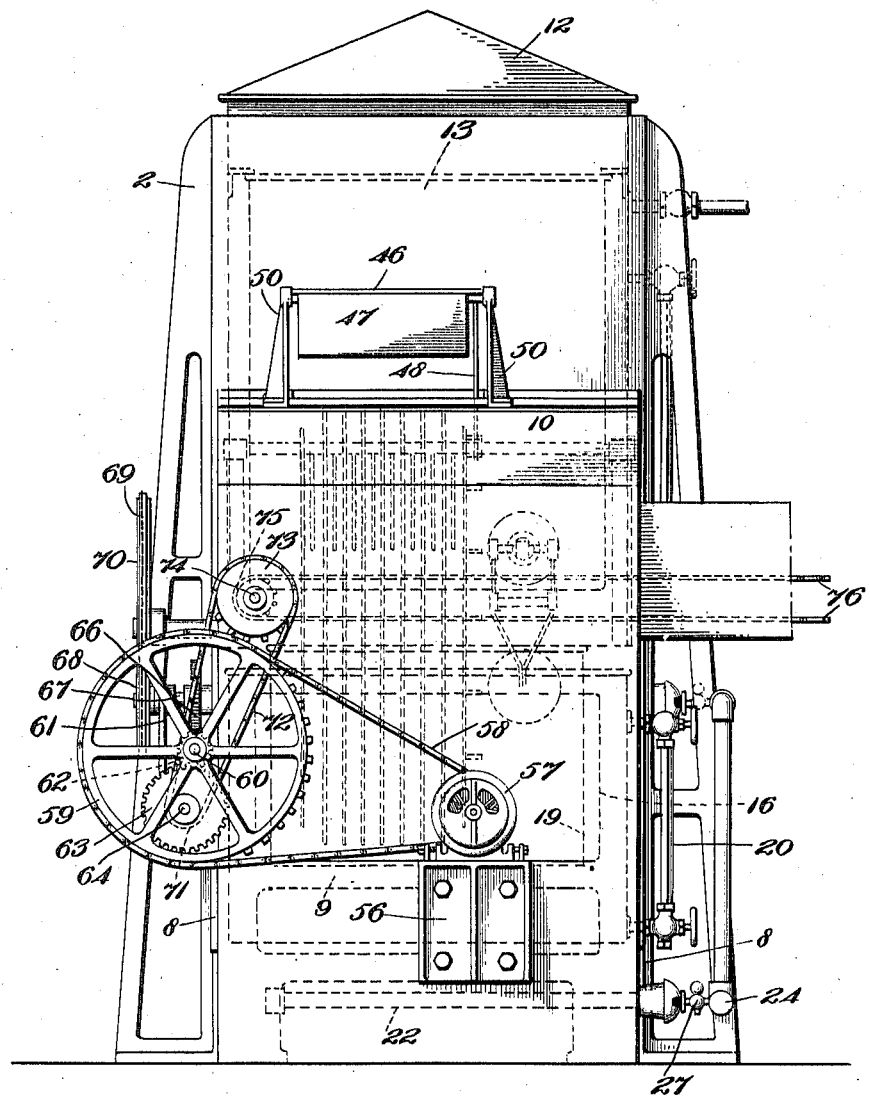
Figure 4:
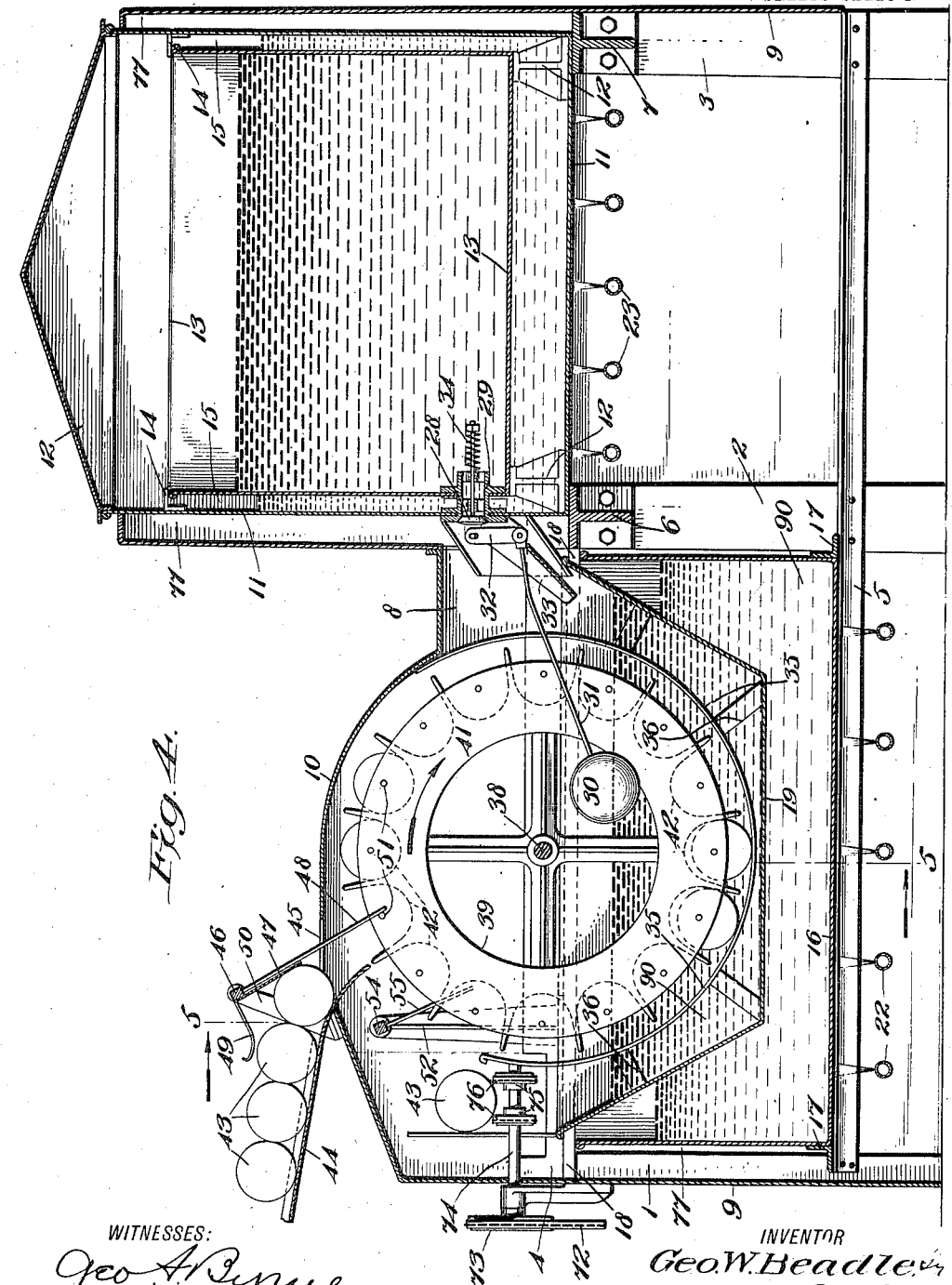
Figure 5:
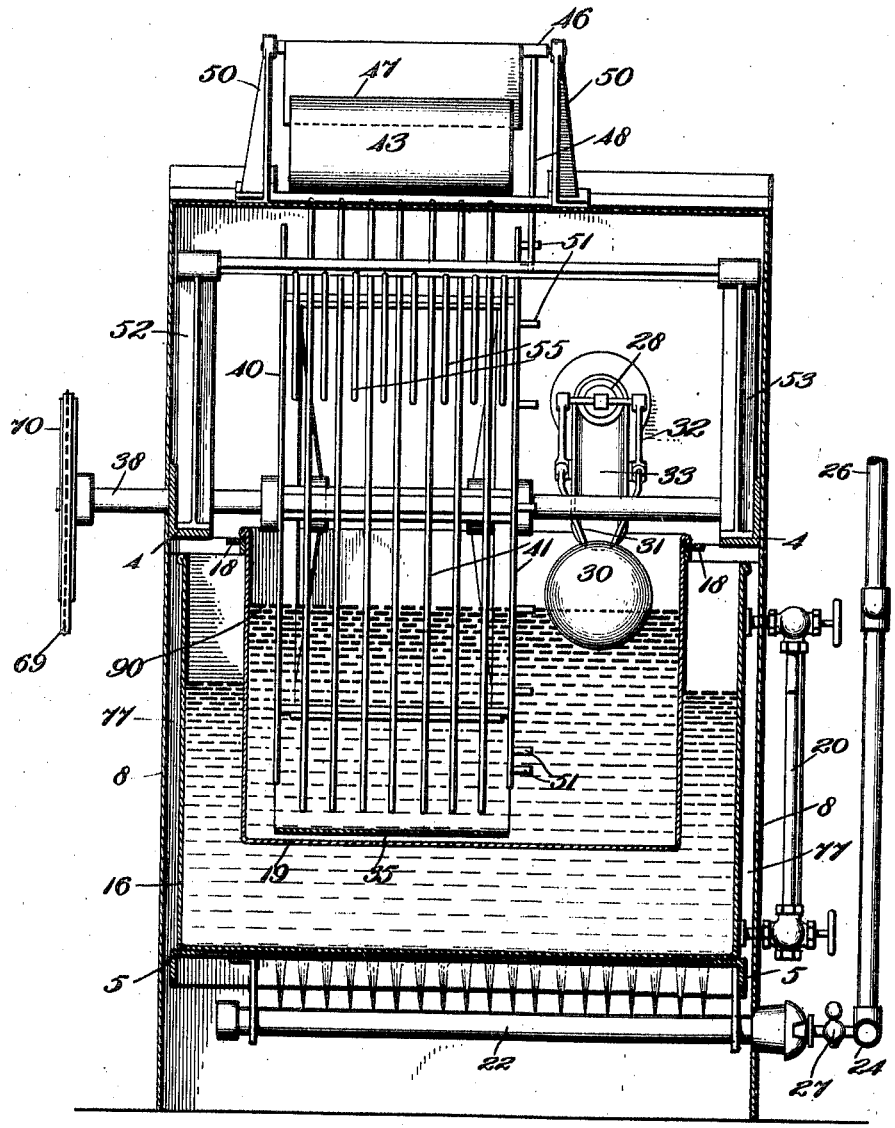
Figure 6:
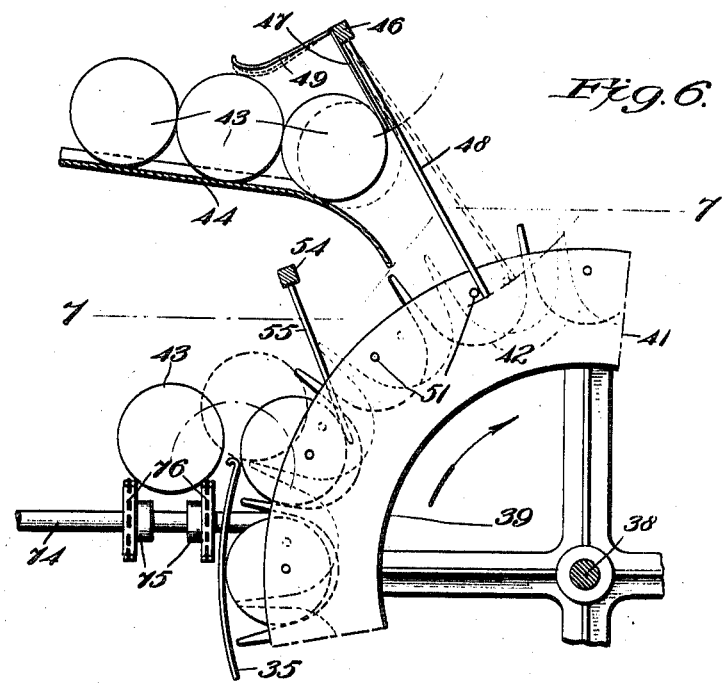
Figure 7:
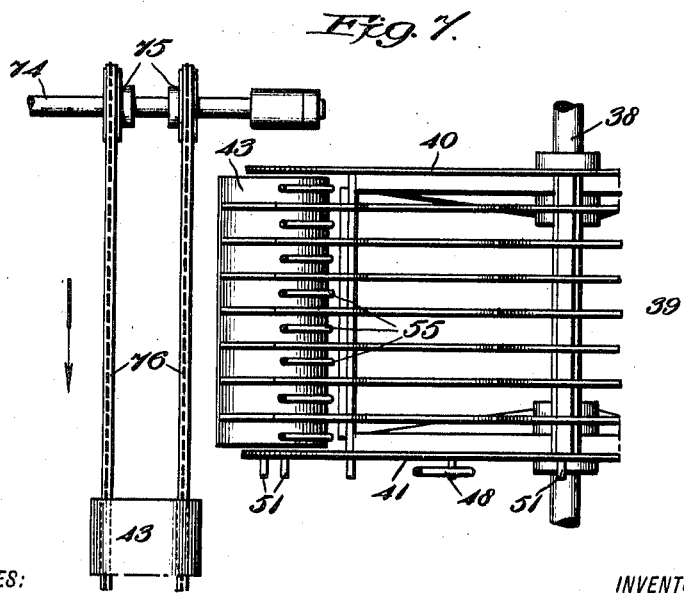

Figure 1 is a side elevational view of my improved machine; Fig. 2 is a top plan view of the same; Fig. 3 is an end elevational view looking toward the right, as shown in Fig. 1; Fig. 4 is a longitudinal sectional view of the machine; Fig. 5 is a cross sectional view taken on the line 5—5 of Fig. 4, and looking in the direction of the arrows; Fig. 6 is an enlarged detail view showing the means for delivering the cartons to and the means for taking the cartons from the paraffining wheel; Fig. 7 is a sectional view taken on the line 7—7 of Fig. 6; and, Fig. 8 is a diagrammatic plan view of the system of piping.

The supporting frame of the machine comprises the upright supports 1, 2 and 3, Figs. 1 and 4, connected by the angle bars 4 and 5, Figs. 4 and 5, and the cross beams 6 and 7 located above the bars 5 and extending across the same. The framework of the machine is also inclosed by a casing composed of side plates 8, end plates 9, and top plates 10.

The cross beams 6 and 7, Fig. 4, connected to the supports 2 and 3 are adapted to support, within the casing, a water tank 11 closed at its top by a removable cover 12. Held within the water tank 11, and resting on supports 12, is a paraffin feed tank 13 which is held against movement within the water tank by the angle stays 14, thereby providing between the water and the paraffin tanks a water and steam space or jacket 15.

16 indicates a second water tank mounted on the angle bars 5 and located below and to one side of the water tank 11 as shown. This tank 16 is also rigidly held in position by the cross angle bars 17 and has suspended therein on the angle bars 18 (see Figs. 4 and 5) a second paraffin tank 19, also surrounded by a water and air space. Gages 20 and 21, Fig. 2, are connected to the water tanks 16 and 11 respectively, for showing at all times the amount of water therein. Suspended under and adapted to heat the water respectively within the said water tanks 16 and 11 for the purpose of melting the paraffin are the gas burners 22 and 23, which receive their supplies of gas through the gas pipes 24 and 25 connected to the main feed pipe 26. These burners are controlled by the valves 27 which are so adjusted as to always keep the temperature within the paraffin tanks 13 and 19 a little above the melting point of the paraffin. The paraffin 90 within the tank 19 is preferably kept at the level shown in Figs. 4 and 5, and when it falls below this level the valve 28, mounted within the outlet 29 in the bottom of the paraffin feed tank 13 will be automatically opened by the float 30 and its connections 31 and 32 with said valve allowing paraffin to flow from the feed tank through the spout 33 to the tank 19. 34 indicates a spring surrounding the valve stem for assisting the float to properly seat the said valve 28 for cutting off the flow after the tank 19 has received its proper supply.

A circular guide casing 35 which performs a function to be described, is held within the paraffin tank 19 by the stays 36.

Mounted on the shaft 38 in the angle bars 4, and adapted to revolve within the paraffin tank 19, is a paraffin wheel 39, which wheel is of skeleton construction and is provided with the annular side plates 40 and 41 between which are located a series of carton receiving pockets 42, and the cartons 43 are fed to these pockets from the supply chute 44 mounted on the top plate 10 of the machine as will now appear. The top plate 10 is provided with an opening 45 through which projects the lower curved end of the said chute 44, and also the operating rod 48 carried by the shaft 46 on which is mounted the plate 47 which normally prevents the cartons from entering said opening 45. The rod or shaft 46 also carries the rearwardly extending spring 49 adapted to contact with the cartons 43 at intervals and to force them forward. The top plate 10 is provided with the brackets 50 in which the shaft 46 turns, and the wheel 39 carries pins 51 adapted to strike the rod 48 at intervals, to rock the shaft 46 thereby raising the plate 47 and causing the springs 49 to force a carton through the opening 45 and into one of the pockets 42, all as will be clear from the drawings. After the cartons, one after another, are thus delivered into the pockets 42, they are carried around by the wheel 39 in the direction of the arrow, immersed in the paraffin 90, and after being thus thoroughly coated inside and out with paraffin, they are brought out on the other side of the wheel, having been guided and held in their passage by the circular casing 35. After the cartons have completed their passage through the paraffin, they are automatically carried out of the machine by the means now to be described.

Rigidly mounted between the brackets 52 and 53 carried by the angle bars 4 is a bar 54, from which is suspended a plurality of stripping rods 55 that project between the elements forming the pockets 42 of the paraffin wheel 39, see Figs. 4, 5, 6 and 7.

A bracket 56 Figs. 1, 2 and 3, carried by the end support 9, holds a small electric motor 57 for operating the machine. This motor drives a chain 58, passing over a sprocket wheel 59, mounted on the outer end of a shaft 60, which shaft has a bearing in a bracket 61, Fig. 2, held to the end of the machine. A pinion 62, Fig. 3 mounted on the shaft 60, drives a gear 63 held on the outer end of a shaft 64, which shaft is also mounted in bearings on the bracket 61.

65, Fig. 1, indicates a worm mounted on the inner end of the shaft 60 for driving the worm gear 66, mounted on the inner end of a stud shaft 67, extending across the shaft 60, and which is also held in bearings in the bracket 61. A sprocket 68, Fig. 2, is mounted on the outer end of the stud shaft 67 for driving the chain 69, for transmitting power to the sprocket wheel 70, mounted on the outer end of the shaft 38, for revolving the paraffin wheel 39. The shaft 64 has also mounted thereon a sprocket 71 for transmitting power, through the chain 72, to the sprocket wheel 73 mounted on the outer end of a shaft 74 journaled in bearings on the framework of the machine. The shaft 74 has mounted thereon, within the frame of the machine, two sprockets 75 over which pass chains 76 for conveying the cartons after they have been coated with paraffin, to an apparatus in which they are dried.

From the mechanism just described it will be clear that as power is transmitted from the motor 57 to turn the wheel 39, the paraffin coated cartons will be forced from the pockets 42 by the stripping rods 55, and over on to the conveying chains 76, which will carry them to a suitable drying chamber not shown.

Small spaces 77 are preferably left between the casing and the water tanks 11 and 16 as best shown in Figs. 4 and 5, in order to better retain the heat in the apparatus.

The water tanks 11 and 16 may be supplied with water and emptied in the following manner:—Supposing the valves 78 and 79 (see Fig. 8) are closed and the valve 80 in the supply pipe 81 communicating with tank 11 is opened, water will be admitted to the tank 11, and after filling the same will pass out through the pipe 82 near its top, and through the pipe 83 into the water tank 16 until it has reached its proper level as shown on the water gage 20, when the supply valve 80 may be closed. When the tanks are to be emptied, the valves 78 and 79 are opened and water will flow through the pipes 83 and 84 and waste pipe 85 to the sewer.

The operation of the machine will be clear from the foregoing but may be briefly summarized as follows:—Supposing the water and paraffin tanks are filled and the gas burners are keeping the paraffin at its proper temperature. The parffin wheel is revolved in the direction shown by the arrows, in Fig. 4, by the motor through the chain 58, sprocket 59, shaft 60, worm 65, worm gear 66, shaft 67, sprocket 68, chain 69, and sprocket wheel 70, and the conveyer chains are operated by the pinion 62, gear 63, shaft 64, sprocket 71, chain 72, sprocket 73, shaft 74, and sprockets 75. In revolving, the pins 51 on the wheel 39 successively contact with the operating rod 48, and through the shaft 46 move the plate 47 out of the path of the cartons and allows them to drop from the chute 44 into the pockets 42 of the paraffin wheel. During each rocking of shaft 46 the two rearwardly extending springs 49 thereon contact with the succeeding carton, (see Fig. 6) and hold it until the rod 48 is again operated by a pin 51. The cartons on the paraffin wheel are guided and held by the casing 35 while in the paraffin bath, until they are thoroughly coated. They are then removed by contacting with the rods 55 and delivered to the conveyer chains 76, which chains travel slowly directly over the paraffin bath, thereby allowing the surplus paraffin to drain back into said bath. From the paraffin machine the cartons are conveyed by the conveyer chains to a drying machine chamber not shown where they are thoroughly dried.

It is obvious that those skilled in the art may vary the details of construction and arrangement of parts without departing from the spirit of my invention, and therefore I do not wish to be limited to the above disclosure except as may be required by the claims.

What I claim is:—

1. In a machine for coating cartons the combination of a coating bath; a means for forcing cartons to pass through said bath; means operated by said forcing means for permitting cartons one at a time to pass to said forcing means; and means to strip said cartons from said forcing means after they have been coated, substantially as described.

2. In a machine for coating cartons the combination of a coating bath; a means comprising a wheel for forcing cartons to pass through said bath; means operated by said forcing means for permitting cartons one at a time to pass to said forcing means; means to strip said cartons from said forcing means after they have been coated; and conveying means adapted to receive said cartons from said stripping means, substantially as described.

3. In a machine for coating cartons the combination of a coating bath; a means comprising a wheel for forcing cartons to pass through said bath; means comprising a rock shaft and plate carried by said shaft operated by said forcing means for permitting cartons one at a time to pass to said forcing means; means to strip said cartons from said forcing means after they have been coated; and conveying means adapted to receive the cartons from said stripping means, substantially as described.

4. In a machine for coating cartons the combination of a coating bath; a wheel provided with pockets located in said coating bath; a chute adapted to convey cartons to said wheel; means controlled by said wheel for permitting cartons to pass one at a time to the pockets of said wheel; means for rotating said wheel; and a stripping means associated with said wheel adapted to force said cartons out of said pockets, substantially as described.

5. In a machine for coating cartons the combination of a coating bath; a wheel provided with pockets located in said coating bath; a chute adapted to convey cartons to said wheel; means comprising an operating rod, a rock shaft and plate carried by said shaft controlled by said wheel for permitting cartons to pass one at a time to the pockets of said wheel; means for rotating said wheel; and a stripping means associated with said wheel adapted to force said cartons out of said pockets, substantially as described.

6. In a machine for coating cartons the combination of a coating bath; a wheel provided with pockets located in said coating bath; a chute adapted to convey cartons to said wheel; means comprising an operating rod, a rock shaft to which said rod is connected, a plate carried by said rock shaft and a cut-off spring all controlled by said wheel for permitting cartons to pass one at a time to the pockets of said wheel; means for rotating said wheel; and. a stripping means comprising a rod and rock shaft associated with said wheel adapted to force said cartons out of said pockets, substantially as described.

7. In a machine for coating cartons the combination of a coating bath; a water bath in which said coating bath is located; means to heat said water bath; means to keep said coating bath at a predetermined level; a wheel provided with pockets located in said coating bath; a chute adapted to convey cartons to said wheel; means controlled by said wheel for permitting cartons to pass one at a time to the pockets of said wheel; means for rotating said wheel; and a stripping means associated with said wheel adapted to force said cartons out of said pockets, substantially as described.

8. In a machine for coating cartons the combination of a supply tank; means for maintaining said supply tank at a predetermined temperature; a coating tank located below said supply tank; means for maintaining said coating tank at a predetermined temperature; means controlling the flow of the coating liquid from the supply to the coating tank; means controlled by the level of the liquid in the coating tank for governing said controlling means; a rotating wheel provided with pockets in said coating tank; and means to feed cartons to said pockets, substantially as described.

9. In a machine for coating cartons the combination of a supply tank; means comprising a water tank for maintaining said supply tank at a predetermined temperature; a coating tank located below said supply tank; means comprising a water tank for maintaining said coating tank at a predetermined temperature; means controlling the flow of the coating liquid from the supply to the coating tank; means controlled by the level of the liquid in the coating tank for governing said controlling means;

means for filling said water tanks; means for emptying said water tanks; a rotating wheel provided with pockets in said coating tank; and means to feed cartons to said pockets, substantially as described.

10. In a machine for coating cartons the combination of a coating bath; means for maintaining said bath at a predetermined temperature; a rotating wheel provided with pockets located in said bath; means controlled by said wheel for permitting cartons to be fed to said pockets; means to strip said cartons from said wheel; a conveying means for receiving said cartons from said stripping means; and power operated means for rotating said wheel and moving said conveyer means, substantially as described.

11. In a machine for coating cartons the combination of a coating bath; means for maintaining said bath at a predetermined temperature; means for maintaining said bath at a predetermined level; a rotating wheel provided with pockets located in said bath adapted to immerse cartons in said bath; means controlled by said wheel for permitting cartons to be fed to said pockets; means to strip said cartons from said wheel after they have been immersed; a conveying means passing over said bath for receiving said cartons from said stripping means; and power operated means for rotating said wheel and moving said conveyer means, substantially as described.

In testimony whereof, I affix my signature, in presence of two witnesses.

GEORGE W. BEADLE.

Witnesses:
H. S. RODGERS,
J. H. GEWECKE.